United States Patent
Gaither et al.

(10) Patent No.: US 6,574,710 B1
(45) Date of Patent: Jun. 3, 2003

(54) COMPUTER CACHE SYSTEM WITH DEFERRED INVALIDATION

(75) Inventors: Blaine D. Gaither, Ft Collins, CO (US); Russ W Herrell, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 226 days.

(21) Appl. No.: 09/629,128

(22) Filed: Jul. 31, 2000

(51) Int. Cl.[7] .............................................. G06F 12/00
(52) U.S. Cl. ...................... 711/122; 711/141; 711/146
(58) Field of Search ............................ 711/118–122, 3, 711/133–136, 141–147

(56) References Cited

U.S. PATENT DOCUMENTS

| | | | | |
|---|---|---|---|---|
| 5,261,066 A | * | 11/1993 | Jouppi et al. ................ | 711/122 |
| 5,577,227 A | * | 11/1996 | Finnell et al. ............... | 711/122 |
| 5,860,095 A | * | 1/1999 | Iacobovici et al. .......... | 711/119 |
| 5,996,048 A | * | 11/1999 | Cherabuddi et al. ......... | 711/122 |
| 6,049,847 A | * | 4/2000 | Vogt et al. .................... | 710/130 |
| 6,078,992 A | * | 6/2000 | Hum ............................ | 711/122 |
| 6,134,634 A | * | 10/2000 | Marshall, Jr. et al. ....... | 711/143 |
| 6,360,301 B1 | * | 3/2002 | Gaither et al. .............. | 711/143 |
| 6,477,635 B1 | * | 11/2002 | Kahle et al. ................. | 711/210 |

* cited by examiner

*Primary Examiner*—Do Hyun Yoo
*Assistant Examiner*—Nasser Moazzami
(74) *Attorney, Agent, or Firm*—Augustus W. Winfield

(57) ABSTRACT

A lower level cache detects when a line of memory has been evicted from a higher level cache. The lower level cache stores the address of the evicted line. When the system bus is idle, the lower level cache initiates a transaction causing all higher level caches to invalidate the line. The lower level cache then places the line into a special state. If a line in the special state is evicted from the lower level cache, the lower level cache knows that the line is not cached at a higher level, and therefore a back-invalidate transaction is not needed.

4 Claims, 4 Drawing Sheets

COMPUTER CACHE SYSTEM WITH DEFERRED INVALIDATION

FIELD OF INVENTION

This invention relates generally to computer systems and more specifically to coherency protocols and inclusion in cache memory systems.

BACKGROUND OF THE INVENTION

Most computer systems employ a multilevel hierarchy of memory systems, with relatively fast, expensive, limited-capacity memory at the highest level of the hierarchy (closest to the processor) and proceeding to relatively slower, lower cost, higher-capacity memory at the lowest level of the hierarchy (typically relatively far from the processor). Typically, the hierarchy includes a small fast memory called a cache, either physically integrated within a processor integrated circuit or mounted physically close to the processor for speed. There may be separate instruction caches and data caches. There may be multiple levels of caches.

The minimum amount of memory that can be transferred between a cache and a next lower level of the memory hierarchy is called a line, or block, or page. The present patent document uses the term "line," but the invention is equally applicable to systems employing blocks or pages.

In most multilevel caches, each cache level has a copy of every line of memory residing in every cache level higher in the hierarchy (closer to the processor), a property called inclusion. For example, in an inclusive two-level cache system, every entry in the primary cache is also in the secondary cache. Typically, when a line is evicted from an upper level cache, the line is permitted to remain in lower level caches. Conversely, in order to maintain inclusion, if a line is evicted from a lower level cache, the lower level cache must issue a bus transaction, called a back-invalidate transaction, to flush any copies of the evicted line out of upper levels of the cache hierarchy. Each back-invalidate instruction causes any cache at a higher level in the hierarchy to invalidate its copy of the item corresponding to the address, and to provide a modified copy of the item to the lower level cache if the item has been modified. Back-invalidate transactions occur frequently and have a significant impact on overall performance, because of increased bus utilization between the caches and increased bus monitoring (snoop) traffic.

Many computer systems employ multiple processors, each of which may have multiple levels of caches. All processors and caches may share a common main memory. A particular line may simultaneously exist in shared memory and in the cache hierarchies for multiple processors. All copies of a line in the caches must be identical, a property called coherency. The copy of a line in shared memory may be "stale" (not updated). If any processor changes the contents of a line, only the one changed copy is then valid, and all other copies must be then be updated or invalidated. The protocols for maintaining coherence for multiple processors are called cache-coherence protocols. In some protocols, the status of a line of physical memory is kept in one location, called the directory. In other protocols, every cache that has a copy of a line of physical memory also has a copy of the sharing status of the line. When no centralized state is kept, all caches monitor or "snoop" a shared bus to determine whether or not they have a copy of a line that is requested on the bus. The present patent document is relevant to any multi-level cache system, but is particularly relevant to multi-processor systems, with each processor having a hierarchy of caches, all sharing a main memory, in a snooping based system.

In a snooping based system, the cache system monitors transactions on a bus. Some of the transactions indicate that an item has been evicted from an upper level of the cache system. However, some transactions may only "hint" that an item has been evicted from a high level of the cache system, but a low level of the cache does not know with complete certainty that the item is not still retained by a higher level. For example, some systems do not implement inclusion at the upper levels of the cache hierarchy. If the system does not implement inclusion at higher cache levels, then a third level cache may see that an item has been evicted from a second level cache, but the third level cache does not know whether a copy of the item is in the first level cache. One possible solution is for the low level cache to immediately issue a back-invalidate transaction (which may be unnecessary). Since the back-invalidate transaction may interrupt other bus activity, the transaction may degrade performance. Another possible solution is for the lower level cache to ignore the hint. If the line is later requested by another cache, then the lower level cache may issue an immediate back-invalidate transaction at the time of the later request, adding latency to the later request. There is a need for a computer cache system which can detect a need for invalidation, without requiring an immediate invalidate transaction.

SUMMARY OF THE INVENTION

A lower level cache stores addresses that may need to be invalidated, and waits until a bus is idle before issuing a back-invalidate transaction. If a lower level cache knows with certainty that an item is invalidated in the higher cache levels, then there is an opportunity for performance enhancement. The lower cache can place the item in a state (called Modified-uncached, or Mu). For items in the Mu state, no back-invalidate transaction is required when the item is evicted from the lower level cache. This improves performance by eliminating the need for some back-invalidate transactions. Accordingly, knowledge that an item has been evicted from a higher level is useful for improving performance, but is not required. In accordance with the invention, a lower level cache includes a list or stack containing addresses of items that have been recently evicted from one higher level of the cache hierarchy, but for which the lower level of the cache does not know with complete certainty that the items are not still retained by some other higher level cache. During idle bus cycles, the lower-level cache issues back-invalidate transactions for addresses in the list, enabling the corresponding items to be placed into the Mu state without interrupting other bus activity. Upon completion of the back-invalidate command, the address is removed from the list. It is permissible for the list or stack to overflow or fill. That is, if the list fills, additional entries may be refused, or new entries may displace old entries, and the only consequence is that some items in the lower level cache are not placed in the Mu state, and a later back-invalidate command may have to be issued at an inopportune time. The resulting cache system can take advantage of the Mu state without requiring complete certainty as to whether evicted items at some levels are still being retained at higher levels in the cache hierarchy.

DETAILED DESCRIPTION OF THE PREFERRED EMBODIMENT OF THE INVENTION

Figure 1:
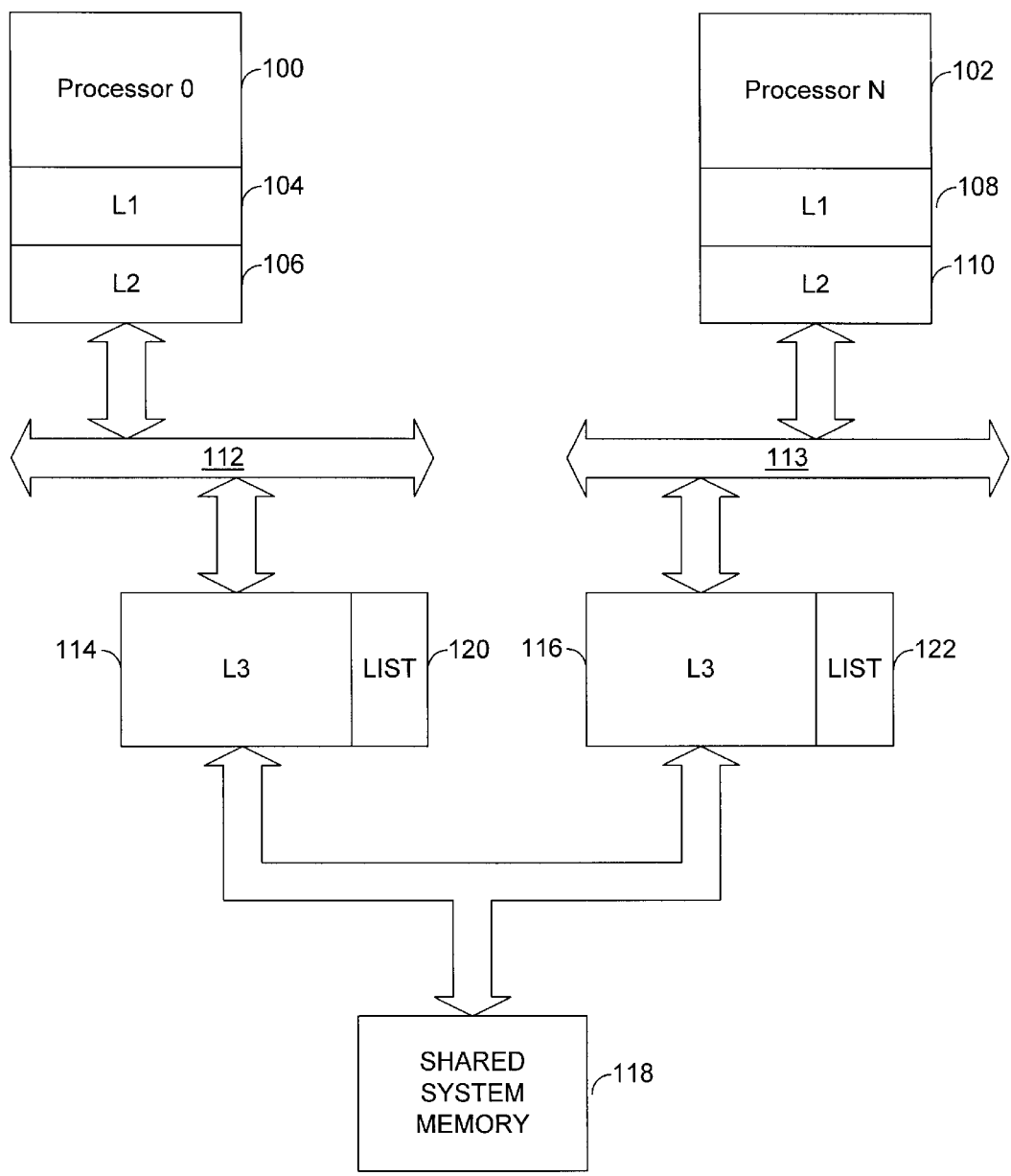
FIG. 1 is a block diagram of an example computer system including a list in accordance with the invention.

FIG. 1 illustrates an example of a computer system with a cache hierarchy, suitable for use with the invention. The system in FIG. 1 has two processors (100, 102). The first processor 100 has two levels of internal cache (104, 106) and an external cache 114. The second processor 102 has two levels of internal cache (108, 110) and an external cache 116. The two processors share a external system memory 118. There are many variations of computer systems that are suitable for use with the invention, with variations of internal and external cache, and variations of bus arrangements. The invention is applicable in any system that has multiple levels of cache memory. Some computer systems may use a directory instead of a lower level cache. A directory is a set of tags for all of the shared system memory. For purposes of the invention, a directory is a cache (which happens to be very large) and the invention is equally applicable to a directory. Of particular interest in FIG. 1, low level cache 114 includes a list (or stack) 120, and low level cache 116 includes a list (or stack) 122, which will be described in more detail below.

Figure 2:
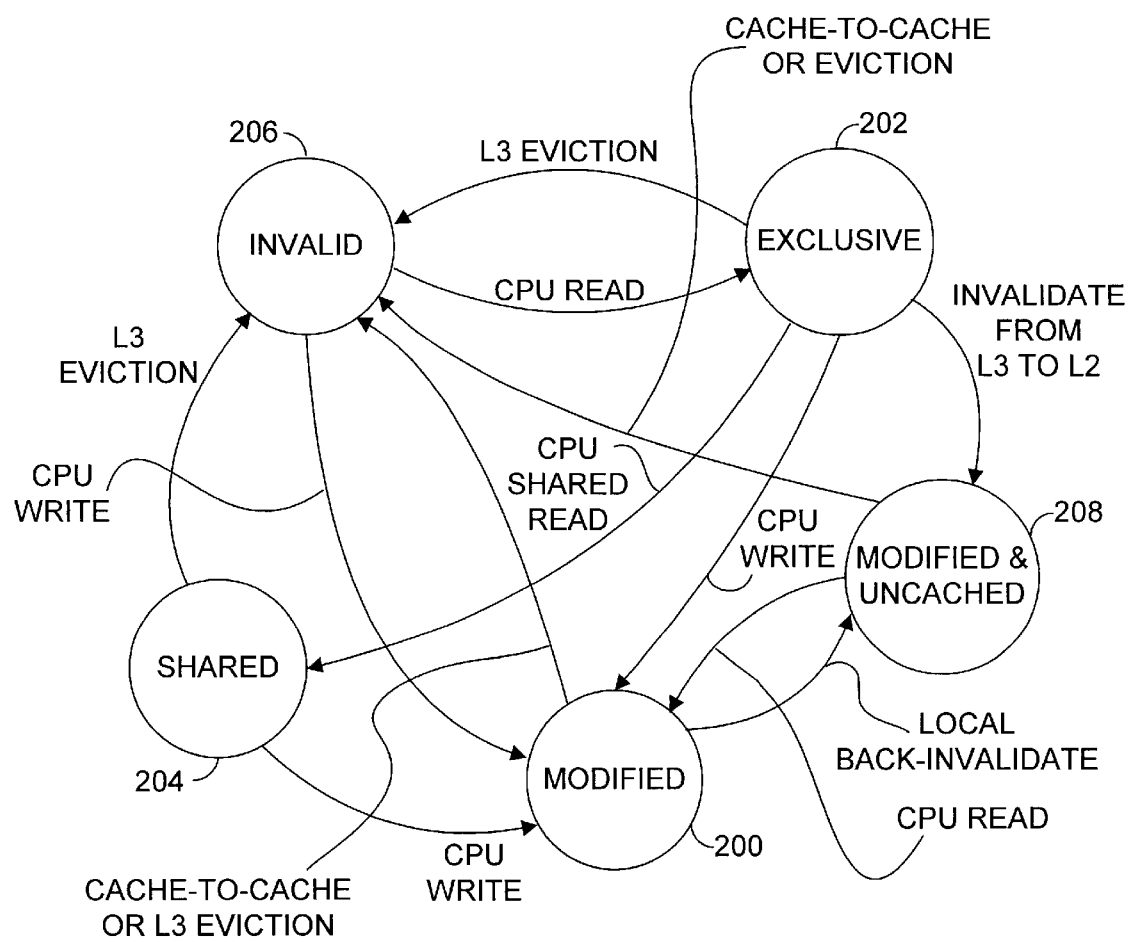
FIG. 2 is a state diagram of a cache coherency protocol suitable for use with the invention.

FIG. 2 illustrates an example cache-coherency protocol suitable for use with the invention. In FIG. 2, some of the state transition lines are labeled as actions for an L3 cache, consistent with FIG. 1, caches 114 and 116. However, the protocol is applicable to a cache at any level except the highest level next to the processor. FIG. 2 illustrates five possible states for each line in a cache. Before any lines are placed into the cache, all entries are at a default state called "invalid" (206). When an uncached physical line is placed into the cache, the state of the entry in the cache is changed from invalid to "exclusive" (202). The word "exclusive" means that exactly one cache hierarchy has a copy of the line. If a line is in an exclusive state in a cache hierarchy for a first processor, and if a second processor requests the same line, the line will then be copied into two cache hierarchies, and the state of the entry in each cache is set to "shared" (204). If a line is modified in a cache, it may also be immediately modified in shared memory (called write through). Alternatively, a cache may write a modified line to shared memory only when the modified line in the cache is invalidated or replaced (called write back). FIG. 2 assumes that the cache is a write-back cache, and accordingly when a line in the cache is modified, the state of the entry in the cache is changed to "modified" (200). A protocol using the four states just described is sometimes called a MESI protocol, referring to the first letter of each of the four states.

The protocol in FIG. 2 has a fifth state (Modified-uncached, or Mu) (208) of particular interest to the invention. The term "uncached" means that the item is not cached at a higher level in the hierarchy. If a line is in the Mu state, and the line is evicted, no back-invalidate transaction is generated. For example, in the system in FIG. 1, if a line in cache 114 is in the Mu state, and the line is evicted from cache 106, cache 114 does not need to issue a transaction to evict the line from cache 104. This is because it is known that caches 104, 106, 108, and 110 do not have copies of the line.

In the protocol illustrated in FIG. 2, if a lower level cache detects a write-back transaction from a higher level cache in the same hierarchy, the state of the line that has been evicted from the higher level cache is changed in the lower level cache from M (200) to Mu (208). For example, in FIG. 1, assume that for processor 0 (100), cache L2 (106) evicts a line. L2 then writes-back to a lower level cache (L3) (114) or shared memory (118). Cache L3 (114) detects the write-back transaction, and the corresponding tag or address, and the state of the corresponding entry in L3 (114) is switched to Mu (FIG. 2, 208). If a line having a state of Mu (208) is read, the state is switched to M (200). For example, in FIG. 1, if a line in cache 114 is at state Mu (208), and the line is then read by processor 0 (100), the state of the line in cache 114 is switched to M (200).

In the system of FIG. 2, a write-back transaction is used by a lower level cache to learn when a modified line is evicted from a higher level cache. If the system provides a transaction or other hint to indicate that a clean line has been evicted from a higher level cache, for example, an explicit eviction hint or a clean-eviction transaction, then additional states can be added for Shared-uncached (Su), and Exclusive-uncached (Eu). Given appropriate hints, the invention is equally applicable to the Su and Eu states.

The additional Mu state (208) in the cache-coherency protocol illustrated in FIG. 2 provides a performance improvement over the well known MESI protocol, because it reduces the number of back-invalidate transactions when it is known with certainty that lines have been evicted from a higher level of the cache. However, as discussed above, some transactions "hint" that a line has been evicted from a higher level of the cache, but there are exceptions in which the line is actually retained at some levels. These transactions create a dilemma as follows. If these lines could be placed into the Mu state, then no back-invalidate transaction would be required when evicted from the lower level cache, but a back-invalidate transaction is required to ensure that the lines can be placed into the Mu state. The solution, in accordance with the invention, is to delay the back-invalidate transactions until the bus is idle. In FIG. 1, lower-level cache 114 includes a list or stack or other storage 120, and lower-level cache 116 includes a list or stack or other storage 122. When the lower-level cache (114, 116) detects a transaction on the bus (112, 113) that hints that a line may have been evicted from an upper-level cache (104, 106, 108, 110), the lower-level cache enters the address of the line in the list (120, 122). The lower-level cache monitors activity on the bus (112, 113) and when the bus is idle, the lower-level cache selects an address from the list (120, 122) and initiates a back-invalidate transaction for the address. The address is then removed from the list (120, 122), and the state of the address in the lower level cache is changed to Mu. By adding storage of addresses to be invalidated, the system gains the benefit of the Mu state without requiring complete certainty regarding inclusion at higher levels of the cache.

The list may be implemented as a first-in-first-out buffer, or as pop-down last-in-first-out stack, or as a simple list in random access memory. It does not matter whether addresses in the list are retrieved in the same order as placement. It does not matter whether the list fills or overflows. That is, if the list fills, new entries may evict previous entries, or new entries may be refused. The only consequence of filling or overflow is that some items in the lower level cache remain in the modified or shared state and are not placed in the Mu state, and a later back-invalidate command may have to be issued at an inopportune time.

Figure 3A:
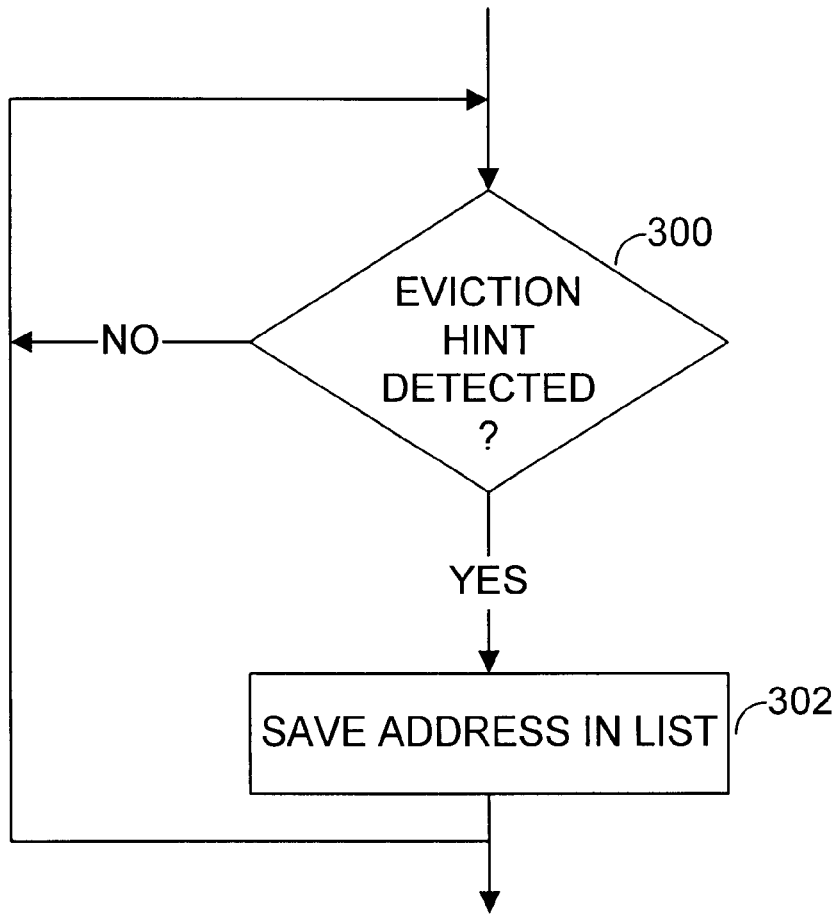
FIGS. 3A and 3B are flow charts of a method in accordance with the invention.
Figure 3B:
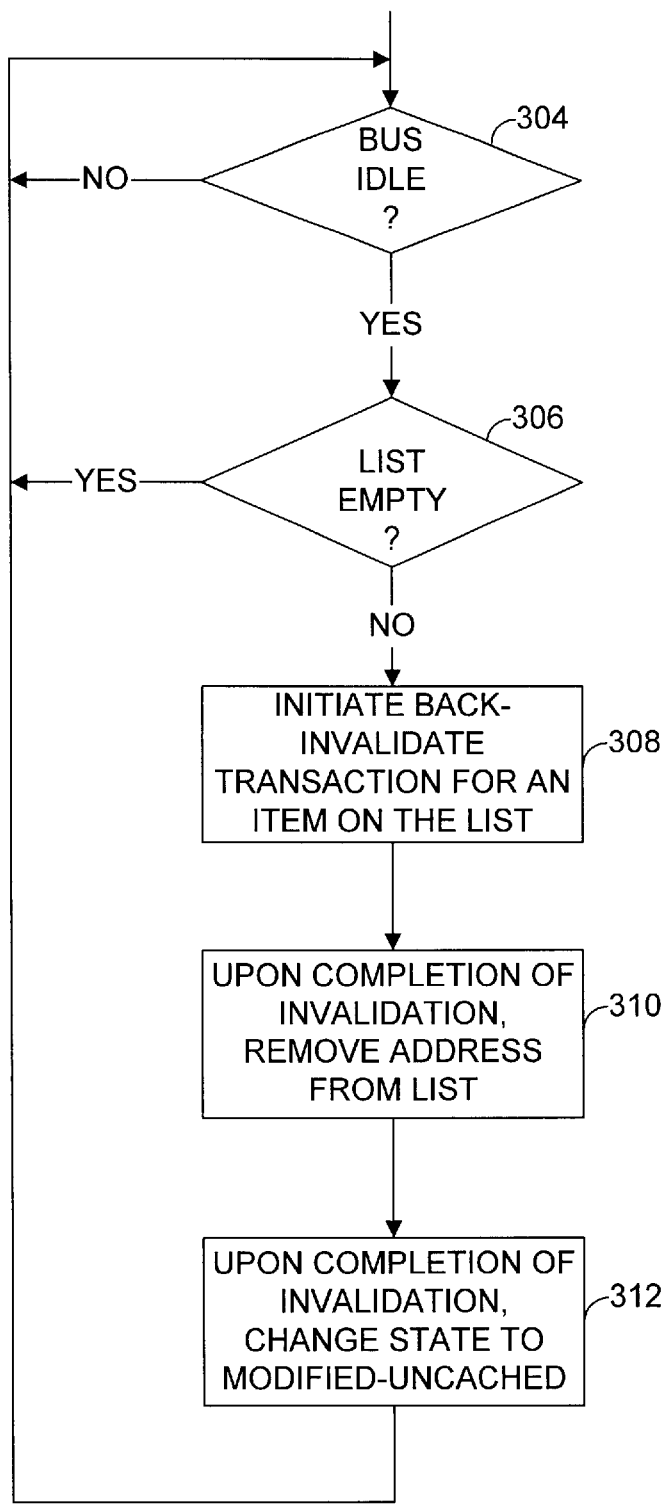

FIGS. 3A and 3B illustrate a method in accordance with the invention. In FIG. 3A, at step 300, a lower-level cache detects whether a line has apparently been evicted from an upper-level cache. If a eviction is detected, then at step 302, the address of the evicted line is placed into a list or stack. Steps 300 and 302 may be repeated many times before an idle condition is detected.

In FIG. 3B, at step 304, the lower-level cache detects whether the bus is idle. If the bus is idle, and if the list is not empty (step 306), then at step 308, the lower-level cache initiates a back-invalidate transaction for an address in the list. At step 310, upon completion of the back-invalidate transaction, the lower-level cache removes the line from the list. At step 312, on completion of the back-invalidate transaction, the lower-level cache changes the state of the address to a Modified-uncached (Mu) state (uncached in a higher level cache).

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for maintaining coherence for a data storage system, the method comprising the following steps:
    detecting, by a first cache, that an entry has been evicted by a higher level cache;
    storing, by the first cache, an address of the entry that was evicted by the higher level cache;
    detecting, by the first cache, that a bus is idle;
    initiating, by the first cache, a transaction directing the higher level cache to invalidate the address.

2. The method of claim 1, further comprising:
    removing, by the first cache, after initiating the transaction, the address from storage.

3. The method of claim 1, further comprising:
    switching, by the first cache, after initiating the transaction, a first state of an entry in the first cache corresponding to the address, to a second state that indicates the entry is not cached in a higher level cache.

4. A computer system, comprising:
    a cache within a cache hierarchy;
    a memory, associated with the cache, the memory containing an address of an item that has been evicted from a higher level of the cache hierarchy;
    where, when a system bus is idle, the cache initiates a transaction causing all higher levels in the cache hierarchy to invalidate the item.

* * * * *